United States Patent [19]

Hill et al.

[11] 4,053,578

[45] Oct. 11, 1975

[54] PROCESS FOR OXIDIZING PRIMARILY NICKEL POWDERS

[75] Inventors: Brian Hill, Ramsey, N.J.; William Herbert Elwood, Jr., Warwick, N.Y.

[73] Assignee: The International Nickel Company, Inc., New York, N.Y.

[21] Appl. No.: 639,486

[22] Filed: Dec. 10, 1975

Related U.S. Application Data

[63] Continuation-in-part of Ser. No. 425,202, Dec. 17, 1973, abandoned.

[51] Int. Cl.$^2$ ............................................. C01G 53/04
[52] U.S. Cl. ........................ 423/592; 423/594; 423/604; 423/605; 423/607; 423/632; 423/633; 75/138
[58] Field of Search ............... 423/592; 148/6.14 R

[56] References Cited

U.S. PATENT DOCUMENTS

| 2,989,373 | 6/1961 | Llewelyn et al. | 423/592 |
|---|---|---|---|
| 3,039,849 | 6/1962 | Willcox | 423/625 |
| 3,322,582 | 5/1967 | Morano | 148/6.14 R |
| 3,525,650 | 8/1970 | Pammer et al. | 148/6.14 R |
| 3,806,591 | 4/1974 | Lauer et al. | 423/592 |

FOREIGN PATENT DOCUMENTS

| 624,106 | 7/1961 | Canada | 423/592 |
|---|---|---|---|
| 1,071,676 | 12/1959 | Germany | 423/592 |
| 1,230,775 | 12/1966 | Germany | 423/592 |
| 1,947,703 | 4/1971 | Germany | 423/592 |
| 45-36171 | 11/1970 | Japan | 423/592 |
| 845,464 | 8/1960 | United Kingdom | 423/592 |

*Primary Examiner*—Herbert T. Carter
*Attorney, Agent, or Firm*—Raymond J. Kenny; Ewan C. MacQueen

[57] ABSTRACT

A process for producing nickel oxide and other products in which percentages of metal powder, particularly nickel powder, and water are blended, the blend being subjected to a heat treatment to form the desired product. In the case of nickel oxide, the blend is exposed to air and temperature sufficient to form an oxide shell substantially about the powder particles, this treatment being followed by a final firing heat treatment.

10 Claims, No Drawings

PROCESS FOR OXIDIZING PRIMARILY NICKEL POWDERS

The present invention is addressed to a novel technique for producing metal products, particularly metal powders such as nickel oxide (NiO) powder of ultra-high purity, and is a continuation-in-part of Ser. No. 425,202 filed Dec. 17, 1973 and now abandoned.

Using nickel oxide for purposes of general discussion, it is well recognized that nickel oxide has found extensive utility in a number of diverse commercial applications, the production of ferrites, for example, being particularly noteworthy. The virtues of nickel oxide notwithstanding, the production thereof has been fraught with attendant difficulties, notably purity of product, friability and sintering problems.

Insofar as we are presently aware, one of the more common procedures for producing nickel oxide involves dissolving nickel metal in an appropriate acid from which basic nickel carbonate is precipitated, a product which is then fired to give nickel oxide. Apart from being a complicated, rather time consuming and expensive process, this technique due to retained anions from the acid lends to a product of less than desired purity.

Among the various solutions heretofore advanced, it has been proposed to roast both nickel metal powder and nickel oxide powder, this to minimize sintering with the concomitant result of achieving a highly pure product. This technique ostensibly has not been found to be a commercially acceptable panacea due largely, it is suspected, to a low degree of efficiency. The oxide particles do tend to separate the metal powder particles from one another and this does inhibit sintering which would otherwise detract from the oxidation process; however, apart from the efficiency aspect the oxide is undesirably hard and thus difficult to grind.

Other proposals have suffered from the conventional problems occasioned by the tendency to produce non-friable masses which in turn necessitate grinding. Again, interfering sintering has been a source of difficulty.

In any case, in terms of nickel oxide per se it has now been discovered that nickel oxide (NiO) powder of very high purity, e.g., not greater than 0.1% or even less than 0.05% of retained metal value, can be produced, the powder being relatively free flowing and friable and amenable to simple grinding while also being virtually impervious to detrimental sintering upon firing, sintering which would subversively undermine the oxidation process.

Generally speaking, the present invention contemplates in terms of the production of high purity nickel oxide (NiO) a sequence of operations, including (i) blending nickel powder, e.g., carbonyl nickel, with water, (ii) heating the mixture in air or other oxygen-containing atmosphere, at a temperature of about 700° to 750° F. to about 1300° or 1350° F., and most advantageously from about 800° to 1000° F., and (iii) thereafter firing the product at a temperature of about 1500° to 1850° F., preferably from about 1600° to 1800° F., for a period sufficient to enable oxidation to go to completion, e.g., about 1 to 2 hours. However, it is to be understood that other powder products apart from nickel oxide can be produced in accordance with the general process of the invention which basically involves blending metal powder to be treated with water and thereafter heating the blend to temperature in an appropriate atmosphere to bring about a reaction to form the desired final product, as will be illustrated herein.

Again, speaking with regard to nickel oxide (and other oxides as well, e.g., iron and cobalt,) the exact of complete theory explanative of the mechanism involved might not yet be at hand, it presently would appear that the overall treatment is multifold in effect. The water blend and milling in air produces an intermediate product of lower bulk density than otherwise might be the case. This lower bulk density, e.g., less than about 1.5 or 1.4 g/cc versus about 2.35 g/cc or more as conventionally experienced, is thought to permit heat to be more readily dissipated away from the powder by flowing air. As a consequence, this prevents too large a temperature excursion which could be causative of excessive sintering of the unoxidized powder metal. Moreover, in terms of the preheat treatment, it is deemed to result in an oxide shell formed substantially about the powder particles without temperature excursion. This initial heat treatment which inhibits sintering need not be conducted beyond about 2 hours, 1 hour being satisfactory where bed depths do not exceed about 1 inch. In producing products not involving reaction with an atmosphere, e.g., nickel aluminide, the preheat treatment would be unnecessary.

In carrying the invention into practice, the water content of the blend should not fall below about 2% (by weight); otherwise, the metal powders manifests an increasing propensity to sinter to a relatively hard mass which, in the case of nickel and similarly behaving materials rather defies further oxidation. On the other hand, should the water percentage much exceed 18% or 20%, a needless thick paste results which only serves to interfere with the overall process. It would impede air circulation in the case of producing oxides, the result being poor oxidation. It is most advantageous that the water content be from about 2.5 or 3% to 7.5 or 8%.

In the case of the oxidation of metal powders, the absence of preheating leads to an ultimate oxidation reaction which is excessively exothermic. This contributes to a hard sintered mass which grinds slowly. What is more, the oxide is impure, the free metal content being unnecessarily high (above about 1% in the case of nickel). A similar experience tends to prevail with preheating temperatures above about 1300° F. Also, at circa 1300° F. and above, some exothermic reaction is experienced. With preheating levels below about 700° F., insufficient surface oxidation occurs to preclude avoidable deleterious sintering on final firing. A temperature range of about 850° to 950° F. is deemed particularly satisfactory. A suitable air flow rate of about 0.1 to about 1 liter/min/gm powder can be employed.

Upon termination of the preheat treatment, to bring about completion of oxidation, the powder is then subjected to firing at a temperature and for a period sufficiently high to complete the process. A temperature of about 1600° to 1800° F. is deemed quite appropriate, the powder being exposed thereat for a period of, say, from about ¾ or 1 hour to 2 or 2½ hours or more, the longer holding periods being used with the lower temperatures. For example, after a preheat treatment at 950° F. for about 1 hour, it was found that firing at 1600° F. for about 4 hours and at 1800° F. for about 2 hours was very satisfactory for a bed depth of ¾ inch. It is preferred that the bed depth of the blend be held to below 1 inch for good oxidation behavior.

The following information and data are given for illustrative purposes.

EXAMPLE I

A 10 gram sample of carbonyl nickel powder was blended with approximately 7.5 % of water. This gave a greatly reduced bulk density of about 1.4 g/cc. The blend was placed on a boat (formed of nickel-chromium alloy) in a furnace at 1250° F. for about 10 minutes, air flowing at a rate of about 0.5 liters per minute being passed therethrough. The temperature was then raised to 1650° F., the powder being fired thereat for approximately 1⅜ hour.

Upon examination, the product was a friable, easily ground oxide and was of high purity with a very low free nickel content of less than 0.05%. These attributes and ease of processing lend significantly to ferrite production.

When the preheat treatment was omitted and the blend was fired at 1650° F. for 2 hours, a greatly excessive or residual nickel content of about 2% obtained. It was considered that an undue amount of sintering occurred, due, it was deemed, to a highly exothermic oxidation reaction.

Using a firing temperature of 1800° F. for 2 hours preceded by a preheat at 950° F. for 1 hour in flowing air resulted in a free-nickel content of but about 0.05%. Similar results were obtained from a preheat at 850° F. for 1 hour followed by firing at 1650° F. for about 4 hours. The bed depth in each case was approximately ⅜ inch.

While the foregoing data have been given in terms of nickel oxide per se, it is considered that other high purity oxides can be produced using the basic concepts above described. Such materials should be of sufficiently high melting point such that the metal does not sinter on firing. It is thought that the oxides of chromium, manganese, iron, cobalt and copper might be amenable to the subject invention. In this connection, the following describe results obtained with an iron-nickel powder used to produce a ferrite.

EXAMPLE II

A charge of 1000 gm of iron-nickel powder, approximately 4$\mu$ in size and analyzing 71.9% Fe, 26.9% Ni, balance carbon and oxygen, was blended in a liquid-solid blender for 5 minutes with 138 gm nickel oxide to adjust the composition of the final product to that of $NiFe_2O_4$, nickel ferrite. Eighty ml of water was introduced into the blender and the mixture was blended for 2 minutes. The blended mixture was then oxidized at 650° C. for 2 hours in a moving air stream of 40 cu. ft/hr. (the carbon and oxygen being removed as $CO_2$), followed by a calcination heat treatment at 1200° C. for 2 hours in a moving air stream of 40 cu. ft/hr. The powder was crushed in a disc pulverizer and ground to about 2.6$\mu$ in a vibrating ball mill. X-ray analysis indicated complete reaction to $NiFe_2O_4$, nickel ferrite.

Product powders other than oxides can be prepared in accordance herewith, this being illustrated by the production of nickel aluminide in Example III.

EXAMPLE III

A charge of 685 gm of Type 123 nickel powder, 4–7 $\mu$ in size, was dry blended with 315 gm of MD-13 aluminum powder, −100 mesh size, for 5 minutes in a liquid-solid blender. One hundred ml of water was introduced into a blender and the mixture was blended for 2 minutes. The blended mixture was then placed in a nickel-chromium alloy boat and heated in a furnace at 1250° F. in a neutral atmosphere of argon for 20 minutes, brought out to the cold zone still under argon, and cooled for a further 20 minutes. The resultant reacted powder was crushed in a disc pulverizer to 100–140 mesh. The crushed powder showed complete reaction to nickel aluminide, NiAl, by X-ray analysis.

The above reaction can also take place in a reducing atmosphere of hydrogen. Nitrogen should not be used as this would favor a reaction of aluminum and nitrogen to form aluminum nitride, AlN. Likewise, oxidizing atmospheres are not favored as they tend to oxidize the aluminum to aluminum oxide, $Al_2O_3$. However, a small amount of oxygen, e.g. up to 10%, could be used with argon, for example, to provide a more electrically conductive nickel aluminide.

The advantage of preparing NiAl powder by this method is that no bulk melting of either constituent is necessary, nor is the final intermetallic in molten form, which would necessitate a temperature of <3000° F. with concurrent erosion and corrosion of the refractories in a ladle and severe oxidation from exposure at high temperature.

We have also produced cobalt aluminide using the same conditions as in Example III, X-ray analysis showing complete reaction to cobalt aluminide.

From the foregoing description and data very close control of the purity and composition is thus seen with the subject process.

Although the invention has been described in connection with preferred embodiments, modifications may be resorted to without departing from the spirit and scope of the invention, as those skilled in the art will readily understand. Such are considered within the purview and scope of the invention and appended claims.

We claim:
1. A process for producing nickel oxide (NiO) which is both readily friable and of high purity which comprises forming a blend of nickel powder and water, the water content being present in an amount of about 2% and sufficient to prevent the occurrence of deleterious sintering during subsequent heat treatment with the upper level being about 20%, subjecting the blend to a preheat treatment in which the blend is exposed to air and a temperature within the range of about 700° F. to about 1350° F. such as to form an outer oxide shell substantially about the powder particle surfaces, whereby undesirable sintering during firing is greatly inhibited, the preheating temperature not exceeding that at which excessive exothermic reaction occurs, and thereafter firing the preheat treated product at a temperature of about 1500° F. to about 1850° F. to complete the oxidation process.

2. A process in accordance with claim 1 in which the water content of the blend is from 3% to less than 18%.

3. A process in accordance with claim 1 in which the water content of the blend is from 2.5% to 8%.

4. A process in accordance with claim 1 in which the preheat treating temperature is at least 800° F.

5. A process in accordance with claim 4 in which the temperature is about 800° to 1000° F.

6. A process in accordance with claim 5 in which the temperature is 850° to 950° F.

7. A process in accordance with claim 1 in which the flow rate of air is from about 0.1 to 1 liter/min/gm of powder.

8. A process in accordance with claim 5 in which the flow rate of air is from 0.1 to 1 liter/min/gm of powder and the time of treatment is about 5 to 20 minutes.

9. A process in accordance with claim 8 in which the firing temperature is about 1600° to 1800° F. and the preheat treated product is fired for about ¾ to 4 hours, the longer period being used at least for the lower temperature.

10. A process in accordance with claim 1 in which the firing temperature is about 1600° to 1800° F.

* * * * *